US 6,639,371 B2

United States Patent
Walters et al.

(10) Patent No.: US 6,639,371 B2
(45) Date of Patent: Oct. 28, 2003

(54) METHOD AND SYSTEM FOR CONTROLLING START OF A PERMANENT MAGNET MACHINE

(75) Inventors: James E. Walters, Carmel, IN (US); Ronald John Krefta, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 120 days.

(21) Appl. No.: 09/932,197

(22) Filed: Aug. 17, 2001

(65) Prior Publication Data

US 2003/0034748 A1 Feb. 20, 2003

(51) Int. Cl.[7] .................... H02K 23/00; H02P 1/18; H02P 3/08; H02P 5/06; H02P 7/06
(52) U.S. Cl. .................... 318/254; 318/430; 318/439; 318/138; 290/40 R; 290/51
(58) Field of Search ............... 318/254, 439, 318/138, 244, 245, 430, 431; 290/40, 51, 52, 48

(56) References Cited

U.S. PATENT DOCUMENTS

| 4,228,384 A | * | 10/1980 | Arnold et al. ............. 318/254 |
| 4,353,016 A | * | 10/1982 | Born ........................ 318/254 |
| 4,686,437 A | * | 8/1987 | Langley et al. ............ 318/254 |
| 4,950,960 A | * | 8/1990 | Krefta et al. .............. 318/254 |
| 5,315,225 A | * | 5/1994 | Heinrich et al. ........... 318/712 |
| 6,150,790 A | * | 11/2000 | Piazzalunga et al. ...... 318/700 |
| 6,232,739 B1 | * | 5/2001 | Krefta et al. .............. 318/652 |
| 6,437,535 B1 | * | 8/2002 | Sinha ....................... 318/800 |
| 6,498,449 B1 | * | 12/2002 | Chen et al. ............... 318/434 |

FOREIGN PATENT DOCUMENTS

| JP | 60226783 A | * | 11/1985 | ............. H02P/1/46 |
| JP | 06261570 A | * | 9/1994 | ............. H02P/1/26 |

* cited by examiner

Primary Examiner—Robert E. Nappi
Assistant Examiner—Edgardo San Martin
(74) Attorney, Agent, or Firm—Margaret A. Dobrowitsky

(57) ABSTRACT

Method and system for controlling a permanent magnet machine are provided. The method provides a sensor assembly for sensing rotor sector position relative to a plurality of angular sectors. The method further provides a sensor for sensing angular increments in rotor position. The method allows starting the machine in a brushless direct current mode of operation using a calculated initial rotor position based on an initial angular sector position information from the sensor assembly. Upon determining a transition from the initial angular sector to the next angular sector, the method allows switching to a sinusoidal mode of operation using rotor position based on rotor position information from the incremental sensor.

16 Claims, 3 Drawing Sheets

METHOD AND SYSTEM FOR CONTROLLING START OF A PERMANENT MAGNET MACHINE

This invention was made with U.S. Government support through Definitized Subcontract C-HEV-5A under MRI/CHRYSLER Subcontract No. ZAN-6-16334-01 under PRIME CONTRACT NO. DE-AC36-83CH10093 awarded by the Department of Energy, and in accordance with the terms set forth in said contracts, the U.S. Government may have certain rights in the invention.

BACKGROUND OF THE INVENTION

The present invention is generally related to control of electromechanical machines, and, more particularly, the present invention is related to method and system for controlling a permanent magnet (PM) machine without using high resolution absolute rotor position information.

In the starting and control of permanent magnet machines using sinusoidal current control, the absolute position of the rotor of the machine is generally required to appropriately position the stator's current vector relative to the rotor's magnet flux vector in order for the machine to develop a desired level of torque.

It is known that various techniques have been proposed to determine absolute rotor position. Some of the proposed techniques require the use of resolver devices. Although resolver devices can accurately determine the absolute position of the rotor, such devices generally require tight positional tolerances and associated driving circuitry, and thus their relatively high cost incrementally adds to the overall cost of a propulsion system that uses permanent magnet machines.

Other techniques have attempted to determine the absolute position of the rotor without the use of sensors. Unfortunately, sensorless techniques may require computationally intensive algorithms and may not be suitable to applications, such as those using flywheel alternator starter systems, where a relatively high initial torque is desired so that, for example, an internal combustion engine coupled to the starter system can be started as quickly as possible under extreme environmental conditions.

Unfortunately, absolute position sensors based on standard position-pulse techniques have limitations since such sensors may not be effectively utilized for applications that require high initial starting torque since the absolute position is not determined until a pulse indicative of relative position of the rotor is received by a controller. For example, the rotor position determination may not occur for up to about one mechanical revolution of the rotor, during which the controller would be unable to appropriately position the current vector relative to the flux vector. This condition could lead either to reduced torque generation or even to negative torque generation.

In view of the foregoing issues, it is desirable to provide techniques capable of producing high initial starting torque without having to use a high resolution absolute position sensor. It would be further desirable to use a low-cost and reliable sensing scheme that allows a standard vector controller that normally operates in a sinusoidal alternating current (AC) mode of operation to run during start up of the machine in a brushless direct current (BLDC) mode of operation to take advantage of the relatively higher torque characteristics that are achievable during the BLDC mode of operation. It is also desirable to be able to seamlessly transition from the BLDC mode of operation to the sinusoidal mode of operation once the startup of the machine is achieved. As will be readily understood by those skilled in the art, the use of the expression brushless direct current mode of operation is a bit of a misnomer since the mode is not truly a DC mode, if by DC one means a mode whose machine voltages and currents are unidirectional for a given condition of speed and torque. In fact, the voltages and currents of the machine generally vary trapezoidally in the BLDC mode of operation, however, the expression BLDC as used herein is consistent with traditional and well-understood usage in the field of electrical motors. For readers desiring further background regarding the operation of brushless DC motors, see $4^{th}$ Ed. of textbook titled "Electric motors" by Cyril G. Veinott and Joseph E. Martin at pp. 261–263, published by McGraw-Hill Book Company.

BRIEF SUMMARY OF THE INVENTION

Generally, the present invention fulfills the foregoing needs by providing in one aspect thereof a method for controlling a permanent magnet machine. The method provides a sensor assembly for sensing rotor sector position relative to a plurality of angular sectors. The method further provides a sensor for sensing angular increments in rotor position. The method allows starting the machine in a brushless direct current mode of operation using a calculated initial rotor position based on an initial angular sector position information from the sensor assembly. Upon determining a transition from the initial angular sector to the next angular sector, the method allows switching to a sinusoidal mode of operation using rotor position information from the incremental sensor.

The present invention further fulfills the foregoing needs by providing in another aspect thereof, a system for controlling a permanent magnet machine. The system includes a sensor assembly for sensing rotor sector position relative to a plurality of angular sectors. The system further includes a sensor for sensing angular increments in rotor position. A module is configured to calculate initial rotor position based on an initial angular sector position information from the sensor assembly, wherein the initial rotor position is used for starting the machine in a brushless direct current mode of operation. A sector-transition module is configured to determine transitions between any two adjacent angular sectors as the rotor of the machine rotates. A switching module is responsive to a switching signal from the sector-transition module to pass rotor position information based on the incremental sensor, the rotor position information being used to provide a sinusoidal mode of operation, in lieu of the brushless direct current mode of operation, upon the sector-transition module determining a transition from the initial angular sector to the next angular sector.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
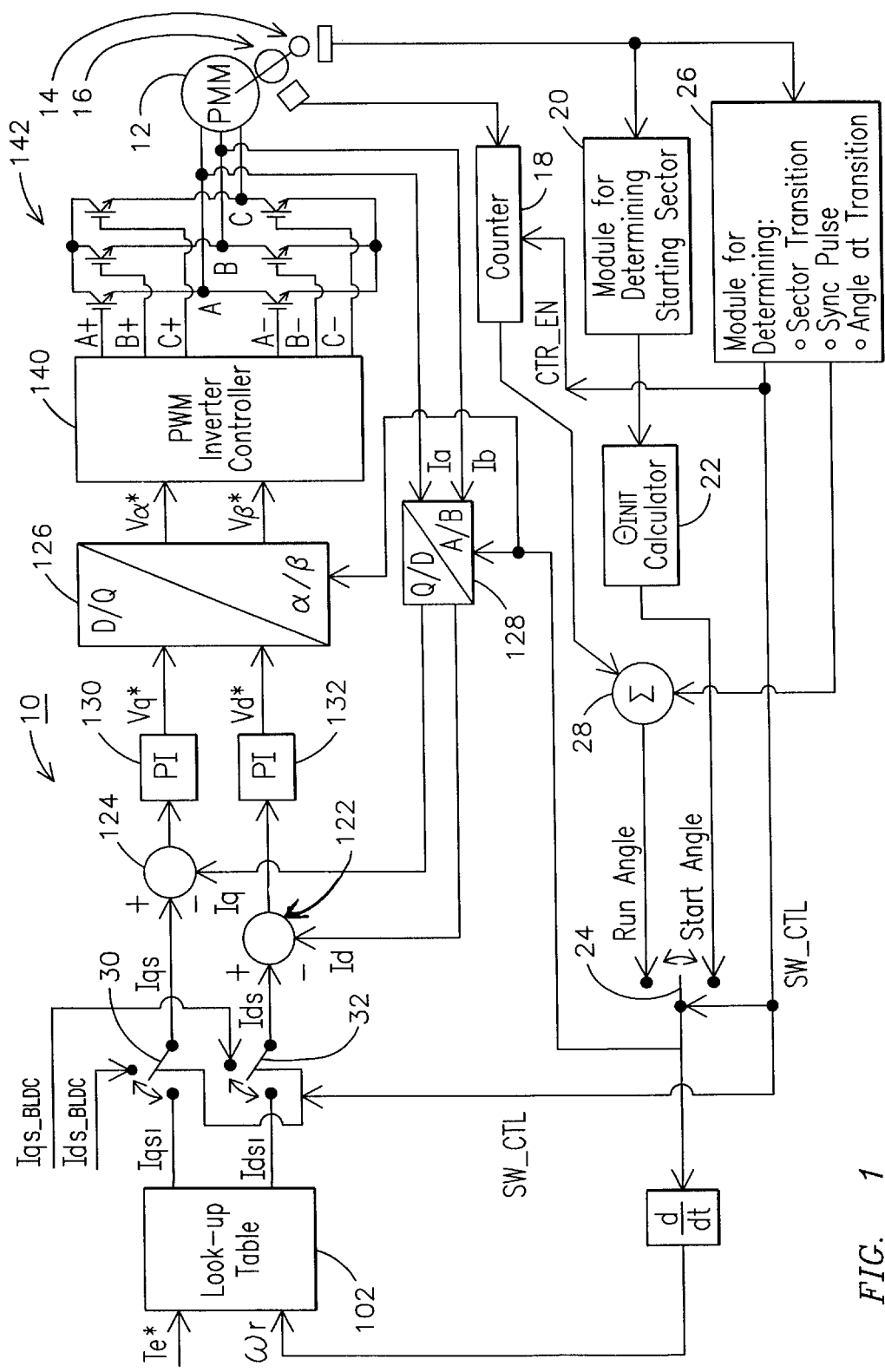
FIG. 1 illustrates a block diagram schematic of an exemplary propulsion system including a vector controller in accordance with one aspect of the present invention.

FIG. 1 shows a block diagram representation of a system 10 embodying aspects of the present invention for controlling a permanent magnet machine (12). As shown in FIG. 1, system 10 includes a sensor assembly 14 for sensing rotor sector position relative to a plurality of angular sectors. In one exemplary embodiment, sensor assembly 14 comprises three sensors circumferentially spaced about 120 electrical degrees from one another. Examples of sensors that may be used for sensing rotor sector position include Hall-effect sensors, magneto-resistive sensors and optical sensors. In one exemplary embodiment, as is well-known for BLDC operation of electrical machines, the three sensors may include a toothed wheel with one tooth per pole pair. Assuming the foregoing circumferential arrangement for the sensors, then one can define a plurality of six angular sectors, each encompassing about 60 electrical degrees. During start up of the machine, the rotor position would be known to a resolution of +/−30 electrical degrees. That is, sensor assembly 14 allows determining the position of the rotor in any respective one of the six angular sectors. Since the machine is being started in a BLDC mode, it is desirable to assign the midpoint angle of the sector. One of the key features of the invention is the fact that a standard vector controller system is used during start up of the machine in a BLDC mode of operation. The inventors of the present invention have recognized that such standard vector controller may be, figuratively speaking "forced" or "tricked" to operate during start up of the machine in the BLDC mode of operation and, thus, take advantage of the relatively superior starting torque generation afforded by that mode. The inventors of the present invention have further recognized that the transition from the BLDC mode to the sinusoidal mode of operation can be achieved in a seamless manner by the vector controller.

FIG. 1 further shows a sensor 16 for sensing angular increments in rotor position. For example, a stream of pulses may be accumulated in a counter 18 to determine rotor position information. The rotor section position from sensor assembly 14 is supplied to a module 20 to determine a starting sector. Module 20 is coupled to a calculator module 22 configured to calculate initial rotor position based on initial angular sector position information from sensor assembly 14. The initial rotor position is passed in a first switching state via a first terminal (e.g., the terminal labeled Start Angle) connectable to a switch 24 to respective voltage and current transformation units 126 and 128 for starting the machine in BLDC mode of operation.

A sector transition module 26 is configured to determine transitions between any two adjacent angular sectors as the rotor of the machine rotates based on rotor sector position information from sensor assembly 14. For example, if the initial rotor position falls in a sector between zero and sixty degrees, then as the rotor position transitions from that initial angular sector to the next angular sector, e.g., the angular sector between 60 and 120 degrees, then module 26 will trigger a switch control signal (SW_CTL) coupled to the counter enable (CTR_EN) terminal of counter 18. It will be appreciated that a suitable scaler is used by the counter to appropriately scale each position pulse to a respective angular increment. Module 26 also provides the appropriate start angle for summing block 28. This would allow counter 18 to start to accumulate pulses indicative of angular increments in rotor position. In this example, the counter will start to accumulate angular increments starting from sixty degrees.

It will be appreciated that the sector transitions, e.g., synchronizing pulses, can also be used to protect against drift by synchronizing the calculated rotor position to a known rotor position. The CTR_EN signal may also be used to clear the counter on each rotation.

The switch control signal is also applied to switch 24 so that switch 24, in a second switching state, may contact a second terminal labeled RUN ANGLE to pass rotor information based on the incremental sensor 16. The rotor position information is used by the voltage and current transformation units 126 and 128 to provide sinusoidal current mode of operation, in lieu of the BLDC mode of operation, upon the sector transition module 26 determining the transition from the initial angular sector to the next angular sector. As suggested above, the transition is preferably made at a point that minimizes current ripple by choosing a start angle that is the midpoint of the sensed angular sector. As shown in FIG. 1, a summer 28 allows combining the angular sector position information from the sensor assembly 14 with rotor position information from the incremental sensor 16 to enhance the accuracy of the rotor position information.

A set of switches 30 and 32 is responsive to the switching signal from module 26 so that in a first switching state switches 30 and 32 pass quadrature current commands (labeled Iqs_BLDC and Ids_BLDC) having a level appropriate for the BLDC mode of operation. The set of switches 30 and 32 is further responsive to the switching signal to pass in a second switching state and quadrature current commands (labeled Iqs and Ids) having a level appropriate for the alternating current mode of operation of the machine. Once again, the transition from the first switching state to the second switching state in switches 30 and 32 occurs upon the sector-transition module 26 determining the transition from the initial angular sector to the next angular sector. As shown in FIG. 1, during the sinusoidal mode of operation, the direct (d) axis current reference ($I_{ds1}$) and the quadrature (q) axis current reference ($I_{qs1}$) may be adjusted as a function of commanded torque $T_e^*$ and rotor speed $\omega_r$ using analytically and/or experimentally derived flux-adjusting values stored in a look-up table 102 that may comprise a two-dimensional look-up table responsive to two respective inputs to supply two outputs. Using techniques well-known to those skilled in the art, look-up table 102 may be configured to provide optimum efficiency control for an ideal case by adjusting the value of the d axis current reference ($I_{ds}$) and the q axis current reference ($I_{qs}$) as a function of commanded torque $T_e^*$ and rotor speed $\omega_r$. The value of the torque reference signal $T_e^*$ may be externally-derived by a system master controller or may correspond to the torque value commanded by an operator through a suitable machine propulsion throttle handle. The value of the rotor speed signal $\omega_r$ may be derived from the rotor angle value supplied by summer 28, upon execution of a mathematical differentiation operation by a suitable differentiator.

Regardless of the source, the d axis current reference, ($I_{ds}$) and a feedback current signal Id is each respectively applied to a subtractor 122 to generate a difference output signal. It will be understood that the subtracting operation respectively executed by subtractor 122 and other such devices described below may be executed by a summer having one inverting input terminal and one non-inverting input terminal. It will be further understood that any of the various arithmetic and logical operations performed in system 10 may be conducted through respective software modules as may be executed in a suitable microprocessor and such operations need not be executed through hardware modules.

It will be appreciated that the difference output signal from subtractor 122 represents an error signal between the d axis current reference signal (Ids) and the feedback current signal Id. Similarly, the torque-producing current component reference Iqs is processed by a subtractor 124 that receives a feedback current Iq. In this case, the difference output signal from subtractor 124 represents an error signal between the torque current component reference signal Iqs and the feedback current signal Iq.

By way of example and not of limitation, a standard vector controller may comprise components such as respective voltage and current transformation units 126 and 128, and two proportional plus integral (PI) current regulators 130 and 132, each such component using techniques well-understood by those skilled in the art. For readers who desire further background regarding vector control techniques, reference is made to Chapters 5 and 6 of a textbook by D. W. Novotny and T. A. Lipo, titled "Vector Control and Dynamics of AC Drives", published by Oxford University Press, 1996, which textbook is herein incorporated by reference. Current transformation unit 128 converts the three-phase currents in the stationary frame into equivalent two-phase orthogonal currents in the rotor frame. After the transformation is performed, the two orthogonal current signals $I_q$ and $I_d$ in the rotor frame are respectively applied to the two PI current regulators 130 and 132 as current feedback signals through subtractors 124 and 122. The output signals from the PI current regulators are then provided to voltage transformation unit 126 and are converted into equivalent two-phase voltage references in the stationary frame. Each respective output signal of voltage transformation unit 126 is then applied to a PWM inverter controller 140 that in one exemplary embodiment may comprise an over-modulation space vector PWM unit to generate three respective duty cycle values. It will be appreciated that the controller functionality is analogous to having six synchronous timers for respectively generating six-gate pulse signals to the respective gate drive circuits of an inverter 142 that energizes the phases of the permanent magnet machine 12. It will be further appreciated that the inverter's legs will be appropriately switched on and off according to the voltage levels of the gate signals from the controller in order to control operation of the permanent magnet machine.

FIGS. 2–5 illustrate signal plots obtained during a simulation for starting a PM machine. In this simulation, the initial rotor angle has been set to zero degrees. For that initial rotor position, the controller would actually assign a rotor position of thirty degrees to be processed, which causes the machine to start in the forward direction and operate in the BLDC mode, until a sector-transition signal is received indicating that the rotor position is at 60 degrees at about 0.17 seconds.

Figure 2:
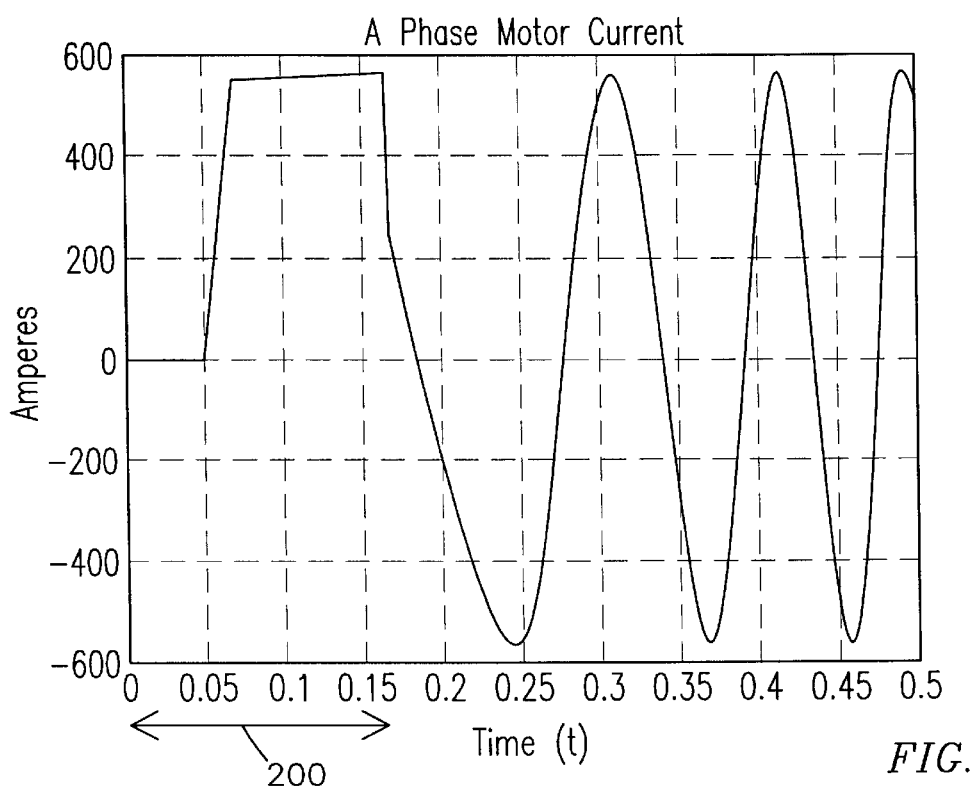
FIGS. 2–5 illustrate respective signal plots obtained during a simulation for starting a PM machine in a brushless DC (BLDC) mode of operation using rotor position information from a standard three-sensor assembly used in the BLDC operation, and then switching to a sinusoidal mode of operation using rotor position information from such assembly and an incremental encoder.

A synchronous frame PI current controller is used to maintain an appropriate current level for the machine. FIG. 2 illustrates an exemplary trapezoidal machine phase current achieved during the BLDC mode of operation during interval 200. At about 0.17 seconds, the machine switches to the sinusoidal AC mode of operation, as illustrated by the sinusoidal machine phase current subsequent to interval 200.

Figure 3:
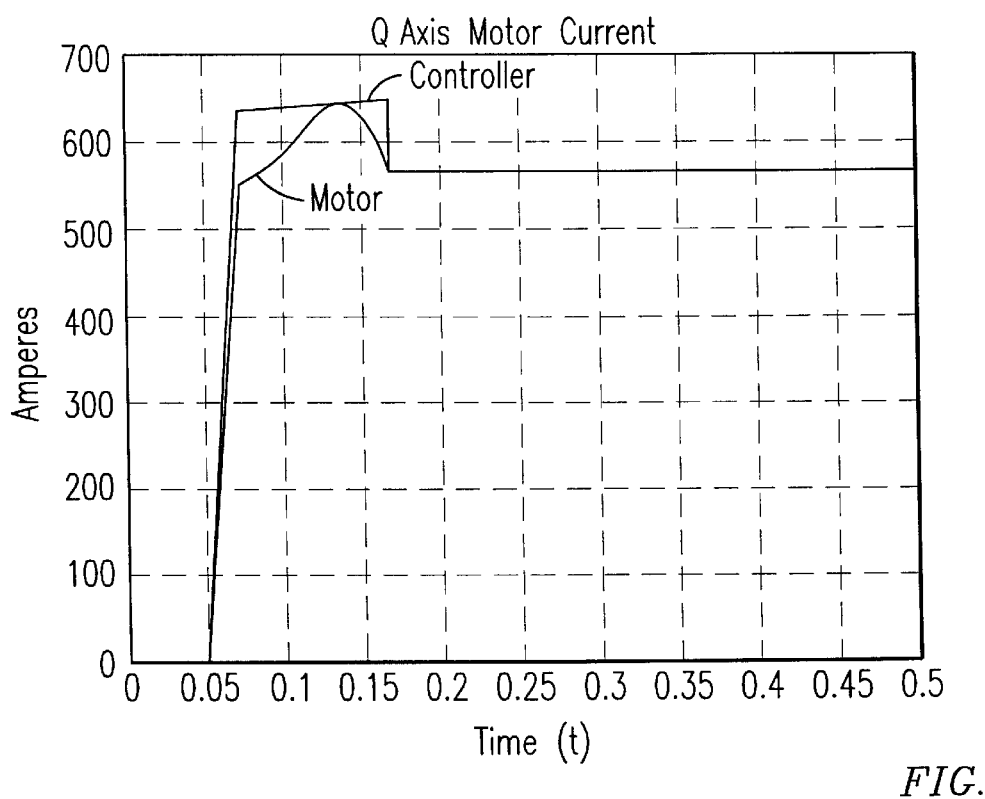
Figure 4:
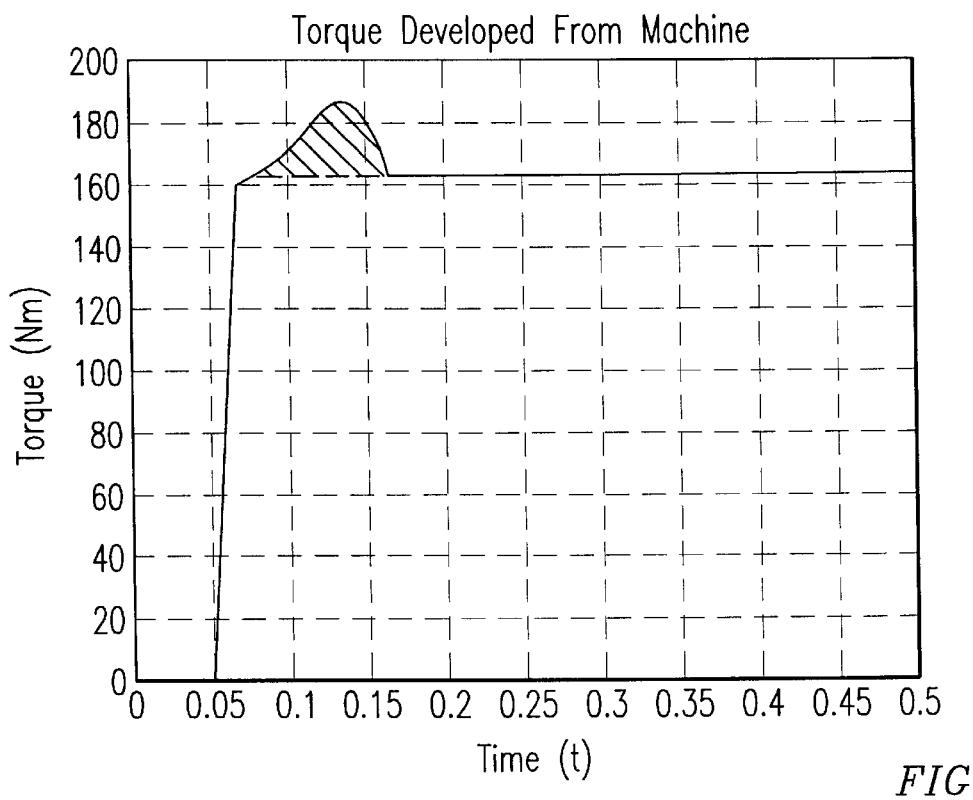
Figure 5:
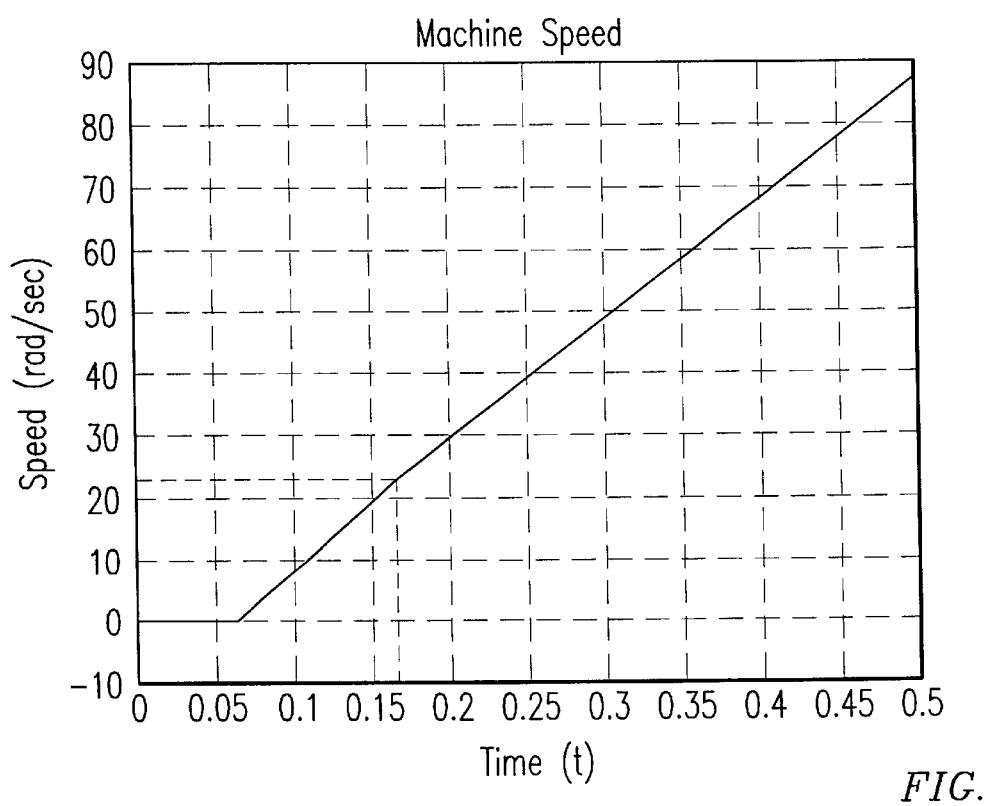

FIG. 3 illustrates a plot of a current command (q-axis current) with an exemplary boost of about 15% during the BLDC mode of operation to take advantage of the extra current margin available during that mode of operation. As seen in FIG. 4, the cross-hatched area represents exemplary additional torque that can be achieved during the brushless DC mode of operation. FIG. 5 is a plot of rotor speed as a function of time. It will be observed in FIGS. 4 and 5 that the transition from the BLDC mode to the AC mode, is virtually seamless as evidenced by the lack of any abrupt discontinuities in torque and speed at the transition point corresponding to about 0.17 seconds.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling a permanent magnet machine, said method comprising:
   providing a sector sensor assembly for sensing rotor sector position relative to a plurality of angular sectors;
   providing a sensor for sensing angular increments in rotor angular position;
   starting the machine in a brushless direct current mode of operation using a calculated initial rotor sector position based on an initial sector position information from the sector sensor assembly; and
   upon determining a rotational transition of the rotor from the initial sector to an adjacent sector, switching to a sinusoidal mode of operation using rotor angular position based on rotor angular position information from the incremental sensor.

2. The method of claim 1 further comprising supplying current commands having a level appropriate for the brushless direct current mode of operation.

3. The method of claim 2 further comprising switching to current commands having a level appropriate for the sinusoidal mode of operation of the machine, upon determining the transition from the initial sector to the adjacent sector.

4. The method of claim 3 wherein the current commands used in the sinusoidal mode of operation are adjusted as a function of commanded torque and rotor position.

5. The method of claim 1 wherein the sector sensor assembly comprises three sector sensors circumferentially spaced about 120 electrical degrees from one another.

6. The method of claim 1 wherein the sector sensor assembly is selected from the group comprising Hall-effect, magneto-resistive, and optical sensors.

7. The method of claim 1 further comprising combining sector position information from the sector sensor assembly with rotor position information from the incremental sensor to enhance the accuracy of the rotor position information.

8. A system for controlling a permanent magnet machine, said system comprising:
   a sector sensor assembly for sensing rotor sector position relative to a plurality of angular sectors;
   a sensor for sensing angular increments in rotor angular position;
   a module configured to calculate initial rotor sector position based on an initial sector position information from the sensor assembly, wherein the initial rotor sector position is used for starting the machine in a brushless direct current mode of operation; and
   a sector-transition module configured to determine transitions between any two adjacent angular sectors as the rotor of the machine rotates; and
   a switching module responsive to a switching signal from the sector-transition module to pass rotor angular position information based on the incremental sensor, the rotor angular position information being used to provide a sinusoidal mode of operation, in lieu of the brushless direct current mode of operation, upon the sector-transition module determining a transition from the initial sector to an adjacent sector.

9. The system of claim 8 further comprising a set of switches responsive to the switching signal to be in a first switching state for passing current commands having a level appropriate for the brushless direct current mode of operation.

10. The system of claim 9 wherein the set of switches are further responsive to the switching signal to be in a second switching state for passing current commands having a level appropriate for the sinusoidal mode of operation of the machine, the transition from the first switching state to the second switching state occurring upon the sector-transition module determining the transition from the initial sector to the adjacent sector.

11. The system of claim 10 further comprising a look-up table for adjusting the current commands used in the sinusoidal mode of operation as a function of commanded torque and rotor position.

12. The system of claim 8 wherein the sensor assembly comprises three sector sensors circumferentially spaced about 120 electrical degrees from one another.

13. The system of claim 8 wherein the sector sensor assembly is selected from the group comprising Hall-effect, magneto-resistive, and optical sensors.

14. The system of claim 8 further comprising a combining module configured to combine sector position information from the sector sensor assembly with rotor position information from the incremental sensor to enhance the accuracy of the rotor position information.

15. A system using a vector controller for controlling a permanent magnet machine, said system comprising:
   a sector sensor assembly for sensing rotor sector position relative to a plurality of angular sectors;
   a sensor for sensing angular increments in rotor angular position;
   a module configured to calculate initial rotor sector position based on an initial sector position information from the sensor assembly, wherein the initial rotor sector position is used for starting the machine in a brushless direct current mode of operation; and
   a sector-transition module configured to determine transitions between any two adjacent angular sectors as the rotor of the machine rotates; and
   a switching module responsive to a switching signal from the sector-transition module to pass rotor angular position information based on the incremental sensor, the rotor angular position information being used to provide a sinusoidal mode of operation, in lieu of the brushless direct current mode of operation, upon the sector-transition module determining a transition from the initial sector to an adjacent sector.

16. A method for controlling a permanent magnet machine using a vector controller, said method comprising:
   providing a sector sensor assembly for sensing rotor sector position relative to a plurality of angular sectors;
   providing a sensor for sensing angular increments in rotor angular position;
   operating the vector controller to start the machine in a brushless direct current mode of operation using a calculated initial rotor sector position based on an initial sector position information from the sensor assembly; and
   upon determining a rotational transition of the rotor from the initial sector to an adjacent sector, switching to a sinusoidal mode of operation using rotor angular position based on rotor angular position information from the incremental sensor.

* * * * *